Feb. 4, 1930.   D. E. GILMORE   1,745,481
FILM FEEDING MECHANISM
Filed Dec. 24, 1925   2 Sheets-Sheet 1
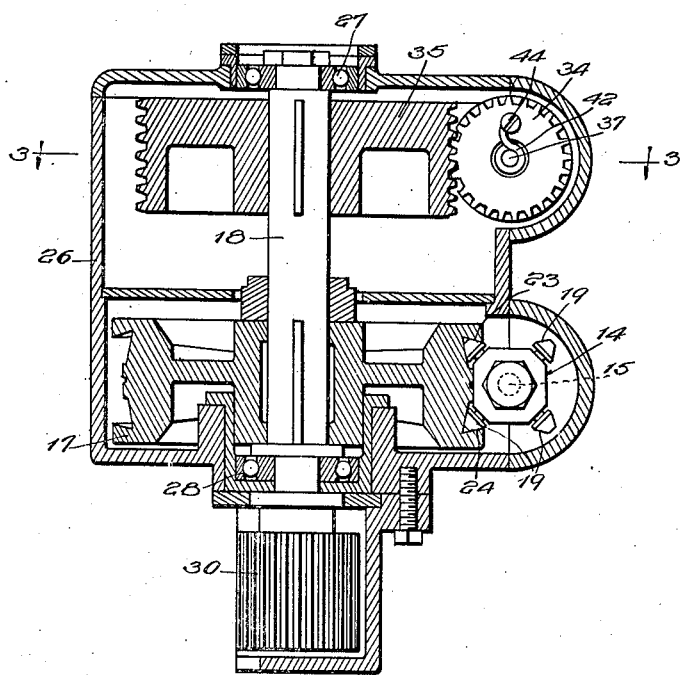
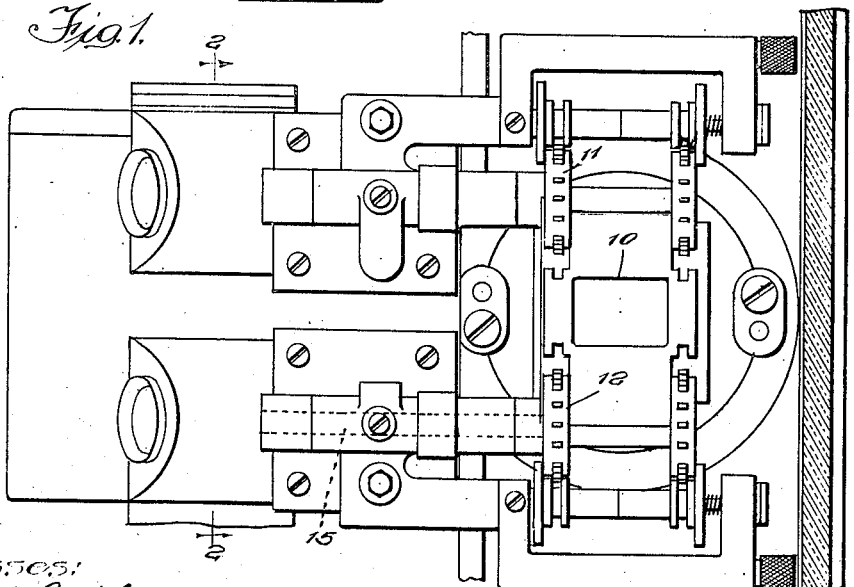

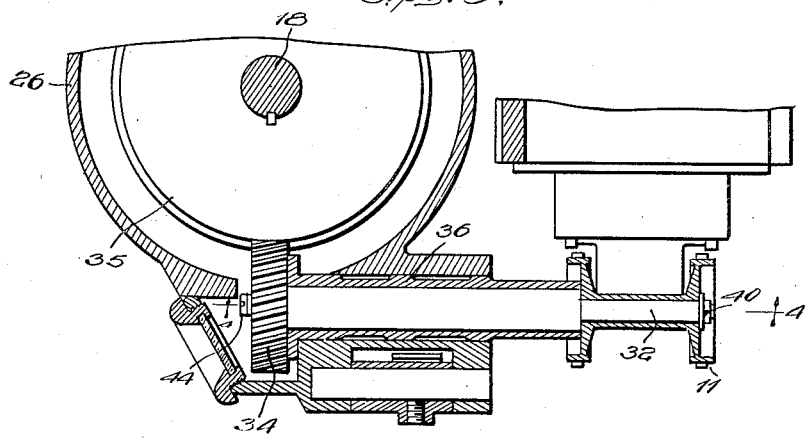
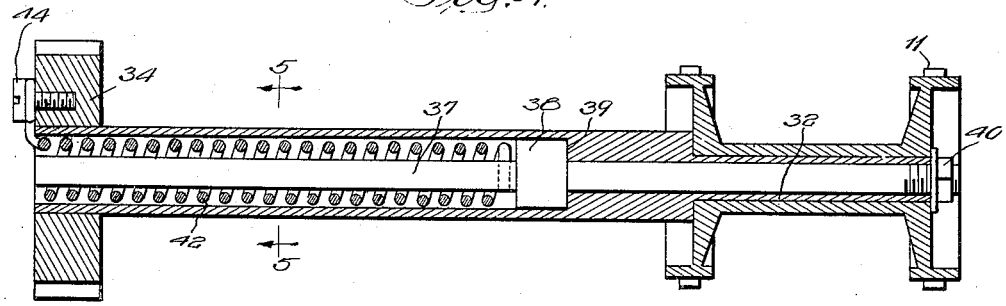
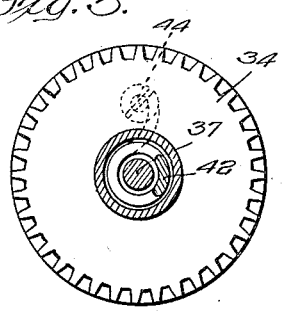

Patented Feb. 4, 1930

1,745,481

UNITED STATES PATENT OFFICE

DAVID E. GILMORE, OF CHICAGO, ILLINOIS, ASSIGNOR TO HELIOS CORPORATION, OF CHICAGO, ILLINOIS, A CORPORATION OF DELAWARE

FILM-FEEDING MECHANISM

Application filed December 24, 1925. Serial No. 77,653.

My invention relates to film feeding mechanism for motion picture apparatus and has among its other objects the production of mechanism of the kind described, which is convenient, compact, durable, efficient and satisfactory for use wherever found applicable.

A particular object of the invention is to provide improved means for tensioning a film when it is aligned with the light projecting aperture of motion picture apparatus.

One form of the invention is embodied in mechanism for advancing a film past the light projecting aperture of a motion picture machine, the film being advanced by a sprocket drum which is intermittently rotated to withdraw the film from another sprocket drum, the latter sprocket drum being adapted to wind up a spring which tensions the film. The spring is unwound by mechanism geared to the means for rotating the first sprocket drum.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a section taken through a motion picture machine and shows film feeding mechanism embodying the invention, the film feeding mechanism being shown in elevation;

Fig. 2 is a section taken on line 2—2 of Fig. 1;

Fig. 3 is a section taken on line 3—3 of Fig. 2;

Fig. 4 is a section taken on line 4—4 of Fig. 3; and

Fig. 5 is a section taken on line 5—5 of Fig. 4.

In the drawings, I have shown a preferred form of the invention embodied in mechanism for feeding a film past the light projecting aperture of a motion picture machine of the type shown and described in the co-pending application of John Proksa, Serial No. 17,336, filed March 21, 1925, but the invention is limited to this use only to the extent indicated in the appended claims.

Referring to Fig. 1, the light projecting aperture is indicated at 10 and aligned therewith are sprocket drums 11 and 12, the sprocket drums 11 and 12 being positioned above and below, respectively, the light projecting aperture 10. The sprocket drum 12 is fixed to a shaft 15 carrying a follower 14, which operatively engages a cam 17 keyed to a vertically disposed shaft 18. The follower 14 comprises a plurality of slidably journaled members 19 adapted to ride in grooves 23 and 24 formed in the cam 17, the cam being designed to rotate the follower 14 through 90 degrees each time the cam is rotated through 360 degrees. The cam 17 holds the follower 14 stationary during the major portion of each revolution thereof, the follower 14 being angularly displaced through 90 degrees while the cam is moving through a relatively small number of degrees. The details of the follower 14 and the cam 17 are more fully shown and described in the co-pending application of Bror A. L. Johansson, Serial No. 77,516, filed December 24, 1925, issued as Patent No. 1,708,542 of Apr. 9, 1929, and need not be fully described in this disclosure as the details of construction thereof do not form a part of my invention. However, it is obvious that the intermittent rotary motion of the follower 14 will be imparted to the sprocket drum 12 and the sprocket drum 12 will intermittently advance a film (not shown) threaded over the sprocket drums 11 and 12, the film being withdrawn from the sprocket drum 11.

The shaft 18 is rotatably journaled in a casing 26, ball bearings 27 and 28 being provided for this purpose. Rigidly secured to the lower end of the shaft 18 is a pinion 30 meshing with a gear (not shown) which forms a part of mechanism adapted to drive the shaft 18, this mechanism being fully shown and described in the above mentioned co-pending application of Proksa, Serial No. 17,336.

The sprocket drum 11 is fixed upon one end of a tubular shaft 32 rotatably journaled in the casing 26 in which, it will be noted, the aforementioned shaft 15 is also rotatably journaled. Rotatably journaled upon the other end of the tubular shaft is a spiral gear 34 which meshes with a spiral gear 35 keyed to the shaft 18, the spiral gear 34 being held against displacement in one direction by a bushing 36 provided for the tubular shaft 32. A pin 37 disposed in the tubular shaft 32 is provided with an integral collar 38 adapted to engage a shoulder 39 formed in the shaft. The collar 38 cooperates with a nut 40 screw-threaded upon the pin to rigidly secure the pin to the shaft. Disposed within the tubular shaft 32 and wound around the pin 37 is a helical spring 42, which has one of its ends secured to the pin and has the other of its ends secured to the spiral gear 34 by a screw 44, or the equivalent. The construction is such that when the film is withdrawn from the sprocket drum 11 by the sprocket drum 12, the spring 42 will be wound up. Thus, the sprocket drum 11 is rotated through 90 degrees each time the sprocket drum 12 is rotated through 90 degrees and the spring 42 is correspondingly tensioned. It may be said that the spring 42 is intermittently tensioned. The spiral gears 34 and 35 are so designed that the spring 42 is slowly unwound at a constant rate when the mechanism is in operation. The spring 42 is placed under tension when it is assembled with the mechanism and the arrangement is such that the gears 34 and 35 unwind the spring at the rate it is wound up by the sprocket drum 11, but constantly instead of intermittently.

The operation of a motion picture machine embodying the invention is substantially as follows: The film is threaded through the motion picture machine in the usual manner, the film being withdrawn from a supply reel (not shown) and being secured to a take-up reel (not shown). During this threading operation the film is meshed with the sprocket drums 11 and 12 to align it with the light projecting aperture 10. The machine is then set in operation and the sprocket drum 12 intermittently advances the film past the light projecting aperture, the film being withdrawn from the sprocket drum 11 against the action of the spring 42, which is wound up during each movement of the sprocket drum 11 and continuously unwound by the gears 34 and 35.

Having thus described my invention, it is obvious that various immaterial modifications may be made in the same without departing from the spirit of my invention; hence I do not wish to be understood as limiting my self to the exact form, construction, arrangement and combination of parts herein shown and described or uses mentioned.

What I claim as new and desire to secure by Letters Patent is:

1. Film feeding mechanism comprising a rotatable sprocket meshing with the film, a rotatable element, means for drawing the film over the sprocket, a spring having one of its ends constrained to rotate with the rotatable sprocket and having the other of its ends constrained to rotate with the rotatable element, and means for driving said element at a substantially constant rate of speed, said element being rotated in a direction to unwind the spring.

2. Film feeding mechanism comprising means engaging the film and adapted to be rotated therewith, a rotatable element, a spring having one of its ends constrained to rotate with the first-mentioned means and having the other of its ends constrained to rotate with said element, means for intermittently advancing said film over said first-mentioned means to tension the spring, and means for rotating the element at substantially constant speed to relieve the tension on the spring.

3. Film feeding mechanism comprising means meshing with the film, a rotatable element, a spring having one of its ends constrained to rotate with the first-mentioned means and having the other of its ends constrained to rotate with said element, means for intermittently advancing said film over said said first-mentioned means to tension the spring, and means for rotating the element at a substantially constant speed to relieve the tension on the spring.

4. Film feeding mechanism comprising a sprocket meshing with the film, a second sprocket meshing with the film means for intermittently rotating said sprocket to advance the film over said first sprocket, a rotatable element, a spring having one of its ends constrained to rotate with said first sprocket and having its other end constrained to rotate with said element, said spring being adapted to yieldingly prevent rotation of said first sprocket, and means for rotating said element at a substantially constant speed to unwind the spring.

5. A film feeding device comprising a rotatable sprocket meshing with the film, means for intermittently rotating said sprocket, a second sprocket meshing with the film and rotatable by the film tension acting thereon, a spring so connected at one end to said second sprocket that it will tend to be wound by the rotation of said second sprocket, and means connected to the other end of said spring and driven by said first-mentioned means for continuously unwinding said spring.

In testimony whereof, I have hereunto signed my name.

DAVID E. GILMORE.